United States Patent [19]

Collins et al.

[11] 4,113,121
[45] Sep. 12, 1978

[54] PIN RELEASE DEVICE FOR A WHEELCHAIR LIFT

[75] Inventors: Donald L. Collins; Harold A. Downing, both of Hutchinson, Kans.

[73] Assignee: Collins Industries, Inc., Hutchinson, Kans.

[21] Appl. No.: 824,533

[22] Filed: Aug. 15, 1977

[51] Int. Cl.² .............................................. B60P 1/44
[52] U.S. Cl. ................................. 214/75 R; 214/660; 214/DIG. 13; 292/166
[58] Field of Search ........... 280/723; 214/75 R, 75 T, 214/75 G, 77 R, 77 P, 95 R, 301 P, 660, DIG. 13; 292/166, DIG. 29

[56] References Cited

U.S. PATENT DOCUMENTS

| 1,536,523 | 5/1925 | Peterson | 292/DIG. 29 |
| 3,146,021 | 8/1964 | Ericson | 292/DIG. 29 |
| 3,613,917 | 10/1971 | Fowler | 214/75 R |
| 3,651,965 | 3/1972 | Simonelli | 214/75 R |
| 4,056,203 | 11/1977 | Meldahl | 214/75 R |

Primary Examiner—John P. Silverstrim
Attorney, Agent, or Firm—Edwin H. Crabtree

[57] ABSTRACT

A pin release device for releasing a wheelchair lift platform attached to a lift frame mounted in an opening in a vehicle. The lift platform pivotally mounted to the bottom of the frame and stored in a vertical position in the opening. When for one reason or another, the power used in raising and lowering the lift fails, the device may be used to lower the lift platform manually to a horizontal position so that a wheelchair may be loaded thereon and removed from the vehicle.

4 Claims, 5 Drawing Figures

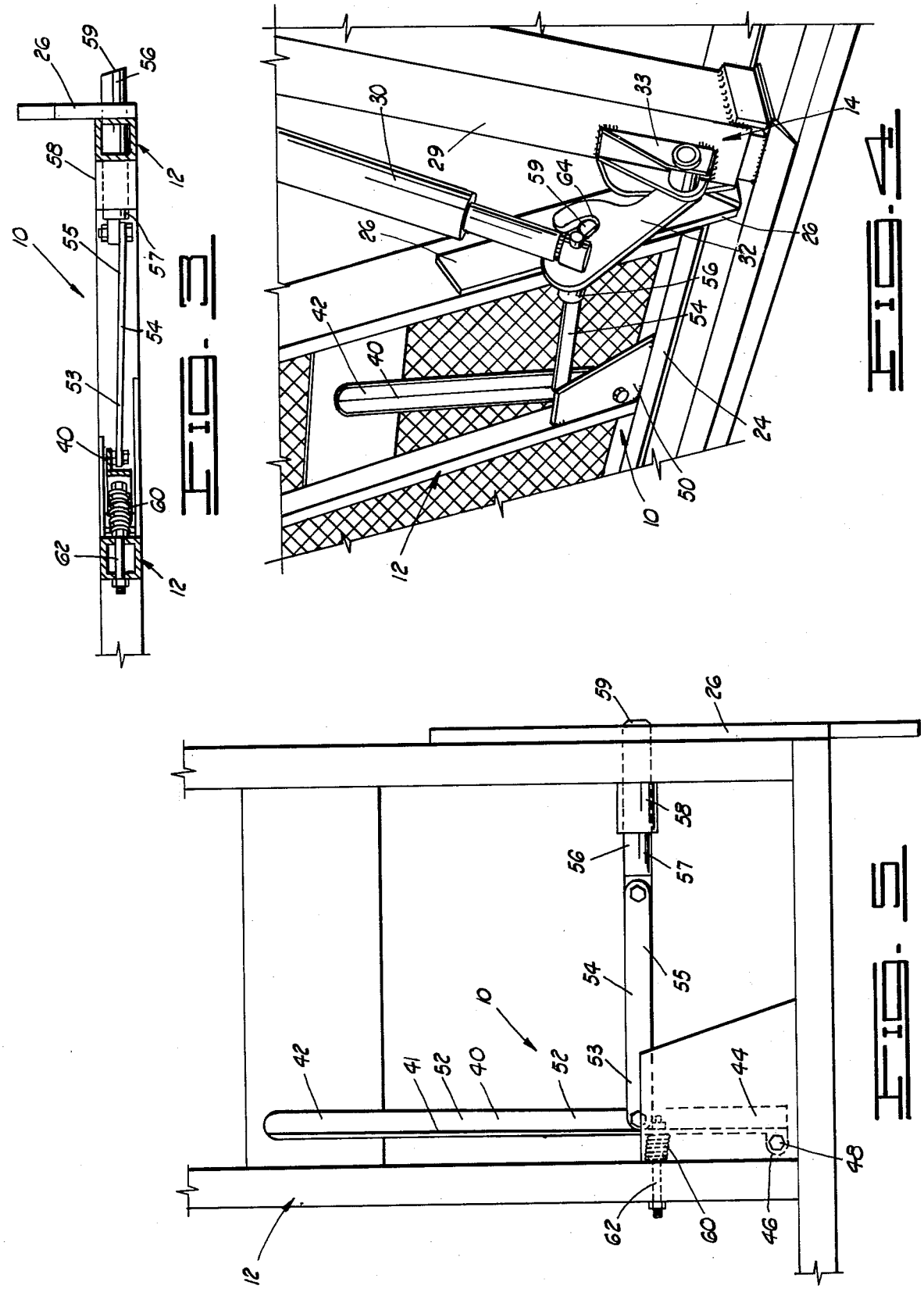

PIN RELEASE DEVICE FOR A WHEELCHAIR LIFT

BACKGROUND OF THE INVENTION

This invention relates generally to a release device and more particularly, but not by way of limitation, to a pin release device used for attaching to a wheelchair lift mounted in an opening in a vehicle and releasing the lift platform for lowering the lift platform from the opening in the vehicle. The device is used in conjunction with a lift described and claimed in patent application Ser. No. 733,242, entitled, "A vehicle wheelchair lift," and filed Oct. 18, 1976.

Heretofore, there have been various types of air, hydraulic, and electrically operated lift platforms used for mounting in an opening in vehicles such as trucks, vans, automobiles, or the like. The lift platform may also be raised and lowered using cables, gearing, or other types of mechanical means. None of the prior art lift platforms provide a pin release device for releasing the lift platform from the lift frame when there is a failure of the primary power source used in lowering and raising the lift platform, such as electrical, hydraulic, or air operated cylinders, so that the lift may be lowered or raised prior to correcting the loss of the primary source of power. The platform also can be lowered by the release device for any other reason than power failure, e.g., convenience.

SUMMARY OF THE INVENTION

The subject invention provides a mechanical means for lowering and raising a lift platform mounted in the opening of a vehicle when the primary source of power used in lowering and raising the lift platform fails. The device is also a back-up means for lowering the lift platform and may be used in case of an emergency when the primary source of power used to lower the lift platform is too slow.

The device is simple in design, rugged in construction, and is positioned on the bottom of the lift platform for quick access in releasing the lift platform so that an occupant in a wheelchair can be quickly loaded on the lift platform and removed from the vehicle.

The pin release device for a wheelchair lift platform includes an elongated handle pivotally mounted on the bottom of a lift platform. A pin arm is attached to one end of the handle. A pin is slidably received in a pin guide mounted on the side of the lift platform with one end of the pin attached to the other end of the pin arm. The other end of the pin is releasably engaged to the side of a lift frame for holding the lift platform in a stored vertical position in the vehicle. A coil spring held in compression is disposed between the side of the handle and a portion of the lift platform for biasing the handle in one direction and in turn holding the pin engaged in the side of the lift frame. By pivoting the handle toward the spring and compressing the spring, the pin is disengaged from the side of the lift frame and the lift platform may be lowered manually to a horizontal position for loading the wheelchair thereon.

The advantages and objects of the invention will become evident from the following detailed description when read in conjunction with the accompanying drawings, which illustrate the preferred embodiments of the invention.

BRIEF DESCRIPTION OF THE DRAWINGS

FIG. 3 is a top view of the pin release device taken along lines 3—3 shown in FIG. 2.

FIG. 4 is a perspective view of the pin release device engaging a fold-up cam attached to a lift frame.

FIG. 5 is an enlarged front view of the pin release device in a retracted position.

DETAILED DESCRIPTION OF THE DRAWINGS

Figure 1:
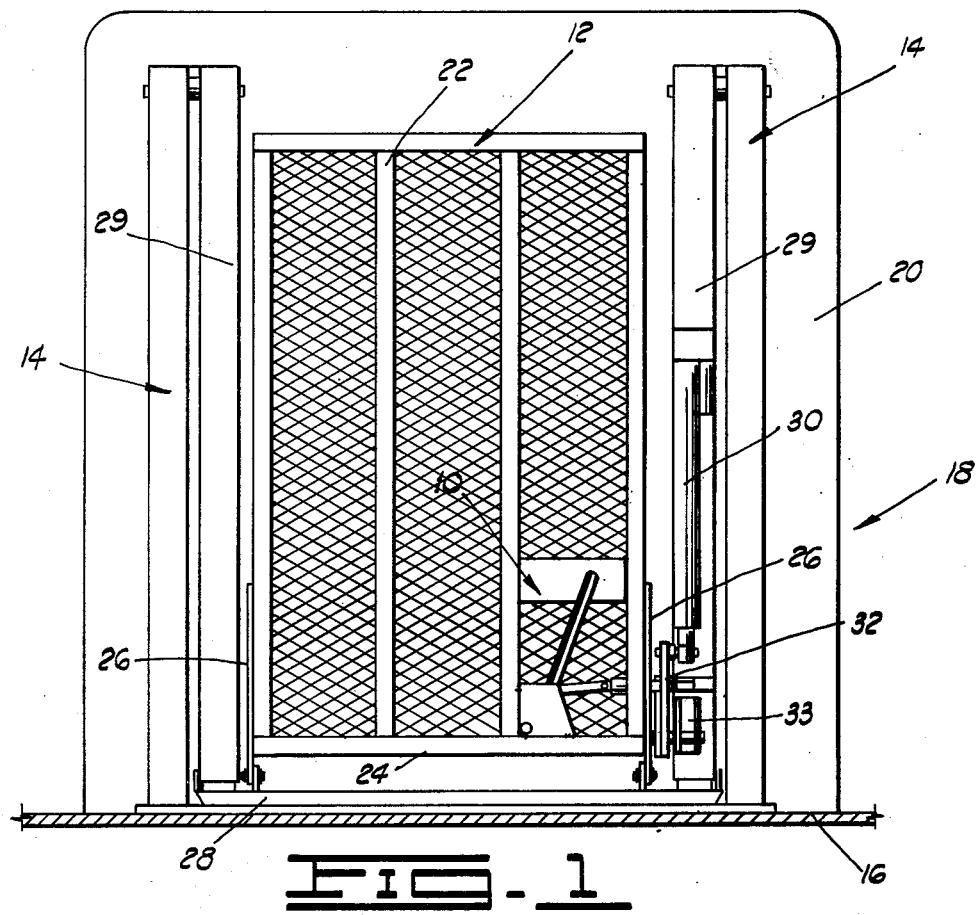
In FIG. 1, a front view of the pin release device is seen mounted in the lower left right hand corner of the bottom of the wheelchair lift platform, which is shown in a vertical stored position in an opening of a vehicle.

In FIG. 1, the pin release is designated by general reference numeral 10. The device 10 is shown mounted in the lower right hand corner of a wheelchair lift platform 12. The wheelchair lift platform 12 is shown in a stored vertical position and pivotally attached to a lift frame 14 mounted to a floor 16 of a vehicle 18 and positioned in an opening 20 in the vehicle 18. The vehicle 18 may be a truck, van, or any other type of vehicle which is used for hauling handicapped in a wheelchair. It should be appreciated that while the pin release device is used with a lift platform for raising and lowering wheelchairs, the invention could be used equally well with any type of lift device which is used for raising and lowering articles thereon. It is also acknowledged, that while the lift platform 12 is mounted in an opening 20 of a vehicle 18, the lift platform 12 could also be used with other transporting types of equipment such as airplanes, trains, or the like, and stationary applications such as porches, loading docks, etc.

The lift platform 12 includes an upper portion 22 and a lower portion 24. The lower portion 24 of the frame 14 is attached to a pair of cam pivot arms 26, which are pivotally attached to a lateral base 28. The ends of the base 28 are attached to the lower end of channels that slide inside housings 29, which are a part of the lift frame 14. The hydraulic housings 29 include hydraulic cylinders mounted therein and are not shown in the drawings for co-acting with an electric screw 30, which is used for raising and lowering the lift platform 12. The screw 30 lowers the lift platform 12 to a horizontal position and at that time, the hydraulic cylinders in the hydraulic housings 29 are activated for lowering the lift platform 12 from the opening 20 of the vehicle 18 to the ground surface, where the wheelchair is discharged therefrom. The lower end of the electric screw 30 is attached to a fold-up cam 32, which is pivotally attached to the bottom of one of the hydraulic housings 29 by a bracket 33.

During the operation of lowering the lift platform 12 from the opening 20 to a horizontal position in front of the opening 20, the fold-up cam 32 releasably engages the pin release device 10 thereby lowering the lift platform 12 as the electric screw 30 is fed outwardly. When the lift platform 12 is raised to a vertical stored position in the opening 20, the device 10 remains engaged with the fold-up cam 32. But, when for one reason or the other, there is an electrical failure in the case of operating the electric screw 30, or should any other source of power be used for raising and lowering the lift platform 12 and such power fails, the pin release device 10 is used for manually releasing the lift platform 12 from the engagement with the fold-up cam 32 so that the lift platform 12 may be lowered to a horizontal position and the wheelchair loaded thereon so that the occupant of the wheelchair may be removed from the vehicle 18.

Figure 2:
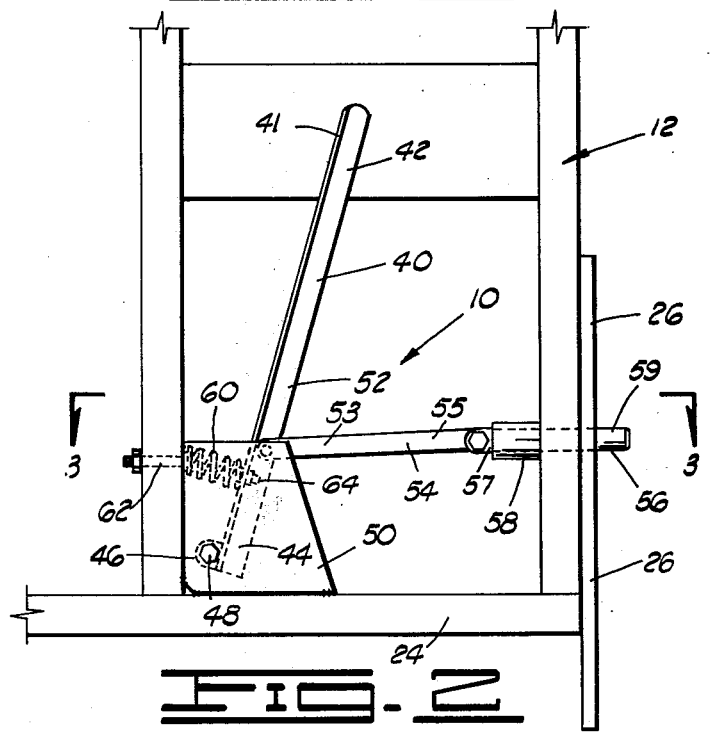
FIG. 2 is an enlarged front view of the pin release device shown in FIG. 1 and in an extended position.

In FIG. 2, a detailed front view of the pin release device 10 is illustrated. The device 10 is shown in an extended position for engaging the fold-up cam 32, although the cam 32 is not shown in this figure. The device 10 includes an elongated handle 40, having a flanged side portion 41. One end 42 of the handle 40 is used for pivoting the handle 40 and releasing the lift platform 12 from the frame 14. An opposite end 44 of the handle 40 includes a bushing 46 which receives a bolt 48 therethrough. The bolt 48 is attached to a support plate 50 for supporting the device 10 thereon. The handle 40 pivots about the bolt 48. A center portion 52 of the handle 40 is attached to one end 53 of a pivot arm 54. An opposite end 55 of the pivot arm 54 is attached to one end 57 of a pin 56. The pin 56 is received through a hollow guide 58, which is mounted in the side of the frame 12. The pin 56 extends through an aperture in one of the cam pivot arms 26, where an opposite beveled end 59 of the pin 56 engages the fold-up cam 32.

The handle 40 is biased by a coil spring 60 held in compression between the side portion 41 of the handle 40 and a portion of the lift platform 12. The spring 60 is attached to the lift platform by a bolt 62. The other end of the spring 60 is attached to the handle 40 by a bolt 64. As can be appreciated, the spring 60 urges the handle 40 in a clockwise direction, pivoting the handle 40 about a pivot point through the center of the bolt 48 thereby urging the pivot arm 54 to the right and holding the end 59 of the pin 56 in engagement with the fold-up cam 32 shown in FIG. 1.

In FIG. 3, a top sectional view of the device 10 is illustrated taken along lines 3—3 shown in FIG. 2. In this view, the pin 56 can be seen extending through the hollow guide 58, the hollow tubular frame of the lift platform 12, and through the cam pivot arm 26. The end 59 of the pin 56 is beveled so that when the pin 56 is released from the fold-up cam 32 and it is desired to again engage the device 10 with the fold-up cam 32, the pin 56 will automatically engage the cam 32 when the lift platform 12 is folded upwardly. This is done when the beveled surface of the end 59 rides against the side of the fold-up cam 32 and the pin 56 is urged inwardly and rides along the side of the fold-up cam 32 and then released into an opening 64 in the fold-up cam 32 thereby engaging the device 10 with the fold-up cam 32. The opening 64 is shown in FIG. 4.

In FIG. 4, a perspective view of the device 10 is shown with the end 59 of the pin 56 engaging the fold-up cam 32. The lift platform 12 is shown in a partially lowered position. As the electric screw 30 is screwed outward, the cam 32 is lowered thereby pivoting the lift platform 12 downward on the pivot arms 26. Should, at any time, the electric power driving the screw 30 fail, the lift platform 12 can be released from the frame 14 by gripping the handle 40 and pivoting the handle 40 clockwise, compressing the spring 60 and disengaging the pin 56 from the cam 32.

In FIG. 5, the device 10 is shown with the handle 40 pivoted in a clockwise direction for illustrating the device 10 in a released position for lowering the lift platform 12 to a horizontal position. In this illustration, the coil spring 60 can be seen compressed between the side of the lift platform 12 and the flanged side portion 41 of the handle 40. The pin arm 54 has moved to the left thereby urging the pin 56 to the left and disengaging the end 59 of the pin 56 from the fold-up cam 32.

Changes may be made in the construction and arrangement of the parts or elements of the embodiment as disclosed herein without departing from the spirit or scope of the invention as defined in the following claims.

I claim:

1. A pin release device for a wheelchair lift platform, the lift platform mounted in an opening of a vehicle and attached to a lift frame adjacent the opening, the lift platform is stored in a vertical position in the vehicle and lowered to a horizontal position for loading a wheelchair thereon, the device used for releasing the lift platform from the lift frame so that the lift platform may be lowered when the source of power normally used in lowering the lift platform fails, the device comprising:
   an elongated handle pivotally mounted on the lift platform;
   a pin arm attached at one end to said handle;
   a pin slidably received in a pin guide mounted on the lift platform, one end of said pin attached to the other end of said pin arm, the other end of said pin releasably engaging the side of the lift frame; and
   biasing means attached to the lift platform and said handle for pivoting said handle and holding said pin in engagement with the side of the lift frame.

2. The device as described in claim 1, wherein said biasing means is a coil spring held in compression between a side of said handle and a portion of said platform.

3. The device as described in claim 1, wherein the end of said pin engaging the side of the lift frame is beveled.

4. A pin release device for a wheelchair lift platform, the lift platform mounted in an opening of a vehicle and attached to a lift frame adjacent the opening, the lift platform is stored in a vertical position in the vehicle and lowered to a horizontal position for loading a wheelchair thereon, the device used for releasing the lift platform from the lift frame so that the lift platform may be lowered when the source of power normally used in lowering the lift platform fails, the device comprising:
   an elongated handle having a side flange portion, one end of said handle used for gripping said handle, the other end of said handle having a bushing attached thereto, the bushing receiving a bolt therethrough for pivoting said handle thereon;
   a support plate attached to the lift platform, the bolt received in the bushing of said handle attached to said support plate;
   a pin arm, one end of said pin arm attached to said handle;
   a pin slidably received in a pin guide mounted on the lift platform, one end of said pin attached to the other end of said pin arm, the other end of said pin beveled for releasably engaging the side of the lift frame; and
   a coil spring held in compression between the side flange portion of said handle and a portion of said lift platform and attached thereto, said coil spring pivoting said handle in one direction and holding said pin in engagement with the side of the lift frame; and
   by pivoting said handle in an opposite direction and compressing said coil spring, the pin is released from the side of the lift frame so that the lift platform may be manually lowered.

* * * * *